(12) United States Patent
Murata (10) Patent No.: US 7,950,300 B2
(45) Date of Patent: May 31, 2011

(54) THRUST TRANSFER DEVICE (75) Inventor: Tomozumi Murata, Yamanashi (JP)

(73) Assignee: THK Co., Ltd., Tokyo (JP)

( * ) Notice: Subject to any disclaimer, the term of this patent is extended or adjusted under 35 U.S.C. 154(b) by 798 days.

(21) Appl. No.: 11/885,963

(22) PCT Filed: Mar. 2, 2006

(86) PCT No.: PCT/JP2006/303966
§ 371 (c)(1),
(2), (4) Date: Sep. 10, 2007

(87) PCT Pub. No.: WO2006/112163
PCT Pub. Date: Oct. 26, 2006

(65) Prior Publication Data
US 2008/0134812 A1    Jun. 12, 2008

(30) Foreign Application Priority Data
Mar. 31, 2005   (JP) ................. 2005-103839

(51) Int. Cl.
*F16H 21/00* (2006.01)
(52) U.S. Cl. .......................................... 74/25
(58) Field of Classification Search ............... 74/25, 27, 74/50, 58, 412 R, 665 F, 665 G; 242/241
See application file for complete search history.

(56) References Cited

U.S. PATENT DOCUMENTS

| 3,046,808 A | * | 7/1962 | De Mart | 74/424.75 |
| 3,861,221 A | * | 1/1975 | Stanley | 74/25 |
| 4,470,646 A |   | 9/1984 | Fuchsluger | |
| 5,390,585 A | * | 2/1995 | Ryuh | 92/32 |

FOREIGN PATENT DOCUMENTS

| JP | 57-69157 A | 4/1982 |
| JP | 1-235621 A | 9/1989 |
| JP | 2004-98703 A | 4/2004 |

* cited by examiner

*Primary Examiner* — Vicky A Johnson
(74) *Attorney, Agent, or Firm* — Young & Thompson (57) ABSTRACT

A thrust transfer device includes: a motor serving as a driving source; a sun gear rotatable to an output shaft of the motor, a plurality of nut members each provided with an outer peripheral external tooth meshed with the sun gear and provided with an inner peripheral nut side spiral screw groove; and a plurality of screw shafts, each provided, at an outer periphery thereof, with a screw side spiral screw groove corresponding to the nut side spiral screw groove, and reciprocally moved in accordance with nut rotation by fitting the screw side screw groove into the nut side screw groove; and an internal tooth gear meshed with the external tooth formed to each of the nut members. When the sun gear is rotated, the nut members perform planetary motion inside the internal tooth gear, by which the screw shafts are reciprocally moved in axial directions thereof.

5 Claims, 12 Drawing Sheets

THRUST TRANSFER DEVICE

TECHNICAL FIELD

The present invention relates to a thrust transfer device, and more particularly, to a thrust transfer device capable of converting rotating motion to reciprocating motion by using a plurality of ball screws and transferring thrust generated by the reciprocating motion.

BACKGROUND ART

A ball screw is a device including a screw shaft and a nut member and has a function for converting rotating motion to linear motion or converting torque to thrust or vice versa. The ball screw attaining such function is used as a device for performing transfer and/or conversion of driving force in all machine or apparatus including general machines, machine tools, precise machines and so on.

For example, as a machine using such ball screw includes an injection molding machine. The injection molding machine is generally provided with a die fastening device and an injection device disposed above the die fastening device to be vertically movable, which utilizes the ball screw for effecting the transfer of the die fastening force in the die fastening device and an injecting motion in the injection device (for example, refer to the following Patent Publication 1).

Patent Publication 1: Japanese Unexamined Patent Application Publication No. 2004-98703

DISCLOSURE OF THE INVENTION

Problems to be Solved by the Invention

The ball screw is utilized in various technical fields as mentioned above for the reason that the ball screw attains preferred functions of driving power transfer and/or conversion. In recent years, it has been required to provide a ball screw for realizing high speed requirement and high power requirement according to requirement of increasing an applicable range of ball screws.

However, it was difficult to manufacture a ball screw for realizing the high speed requirement and high power requirement in the use of conventional manufacturing technology. For example, in a case it is required to realize the high speed requirement and high power requirement by the ball screw as single member, it will be considered to make enlarge the ball screw itself or to increase the number of threads of a screw groove. However, in the case of the enlargement of the ball screw itself, there is a fear of increasing manufacturing cost such as increasing in working cost for reducing strain generated at a heat treatment process. On the other hand, in the case of increasing the number of threads of the screw groove, since a high lead performance in a longitudinal direction of the screw groove is required, it becomes difficult to work the screw groove, and in a case where a required high lead performance is not achieved, a desired load capacity is not obtained.

The present invention has been conceived in consideration of the circumstances mentioned above, and an object thereof is to provide a thrust transfer device capable of performing fine speed operation as well as high speed operation and realizing the high power requirement by combining a plurality of existing ball screws manufactured conventionally.

Means for Solving the Problem

The thrust transfer device according to one aspect of the present invention includes: a motor serving as a driving source; a sun gear mounted to be rotatable to an output shaft of the motor, a plurality of nut members each provided, at an outer periphery thereof, with an external tooth meshed with the sun gear and provided with, on an inner peripheral surface thereof, with a nut side spiral screw groove; and a plurality of screw shafts, each provided, at an outer periphery thereof, with a screw side spiral screw groove corresponding to the nut side spiral screw groove, and reciprocally moved in accordance with rotating motion of the nut member by fitting the screw side screw groove into the nut side screw groove, wherein when the sun gear is rotated, the nut members are rotated, and according to the rotating motion of the nut members, the screw shafts are reciprocally moved in axial directions thereof.

The thrust transfer device may further include an auxiliary plate fixed to one side end portions of the plural screw shafts and a pressing plate fixed to another side end portions of the plural screw shafts, wherein thrust generated by the reciprocating motion of the screw shafts is transferred through the pressing plate.

The thrust transfer device according to another aspect of the present invention includes: a motor serving as a driving source; a sun gear mounted to be rotatable to an output shaft of the motor; a plurality of nut members each provided, at an outer periphery thereof, with an external tooth meshed with the sun gear and provided with, on an inner peripheral surface thereof, with a nut side spiral screw groove; a plurality of screw shafts, each provided, at an outer periphery thereof, with a screw side spiral screw groove corresponding to the nut side spiral screw groove, and reciprocally moved in accordance with rotating motion of the nut member by fitting the screw side screw groove into the nut side screw groove; and an internal tooth gear meshed with the external tooth formed to each of the nut members, wherein when the sun gear is rotated, the nut members perform planetary motion inside the internal tooth gear, and according to the planetary motion thereof, the screw shafts are reciprocally moved in axial directions thereof.

The thrust transfer device may further include an auxiliary plate fixed to one side end portions of the plural screw shafts; a pressing plate fixed to another side end portions of the plural screw shafts; and a thrust bearing disposed on a surface opposite to the screw shaft connection surface of the pressing plate, wherein one of track races of the thrust bearing is fixedly mounted to the pressing plate and another one of the track races is mounted in a non-restricted manner, the one of the track races absorbs a rotating motion generated by the planetary motion of the nut members, and the another one of the track races transfers only thrust generated by the reciprocating motion of the screw shafts.

In this aspect, the thrust transfer device may further include a motor for control, and a gear for control mounted to be rotatable to a motor shaft of the motor for control, wherein the internal tooth gear is provided, on an outer periphery thereof, with an external tooth for control, and the control external tooth is connected to the control gear through a geared belt, so that the thrust generated by the reciprocating motion of the plural screw shafts becomes controllable.

It may be desired in the thrust transfer device of the aspect mentioned above, the nut side screw groove provided for the nut member and the screw side screw groove provided for the screw shaft are fitted to each other through a rolling member.

Effects of the Invention

According to the present invention, it is possible to provide a thrust transfer device capable of realizing high speed requirement and high power requirement. Such a thrust transfer device is constructed by incorporating plural sets of existing ball screws, so that the thrust transfer device can be provided without requiring high working technology, high working performance, high working cost and so on. In addition, according to the present invention, the speed and the power can be optionally changed, so that it is possible to provide a thrust transfer device capable of obtaining a required thrust.

BEST MODE FOR CARRYING OUT THE INVENTION

Hereunder, preferred embodiments for carrying out the present invention will be described with reference to the accompanying drawings. The described embodiments do not limit the invention concerning respective claims, and in addition, all the combination of subject features described in the embodiments is not always essential to the solving means for the invention.

First Embodiment

Operational Principle

First, with reference to FIGS. 1 and 2, an operational principle of a thrust transfer device according to a first embodiment will be described. Herein, FIG. 1 is a view for explaining the operational principle of the thrust transfer device according to the first embodiment, which is a developed perspective view showing an outer appearance of main constructional elements, and FIG. 2 is a view for explaining the operational principle of the thrust transfer device according to the first embodiment, which is a cross sectional side view showing only a main part for transferring power.

Figure 1:
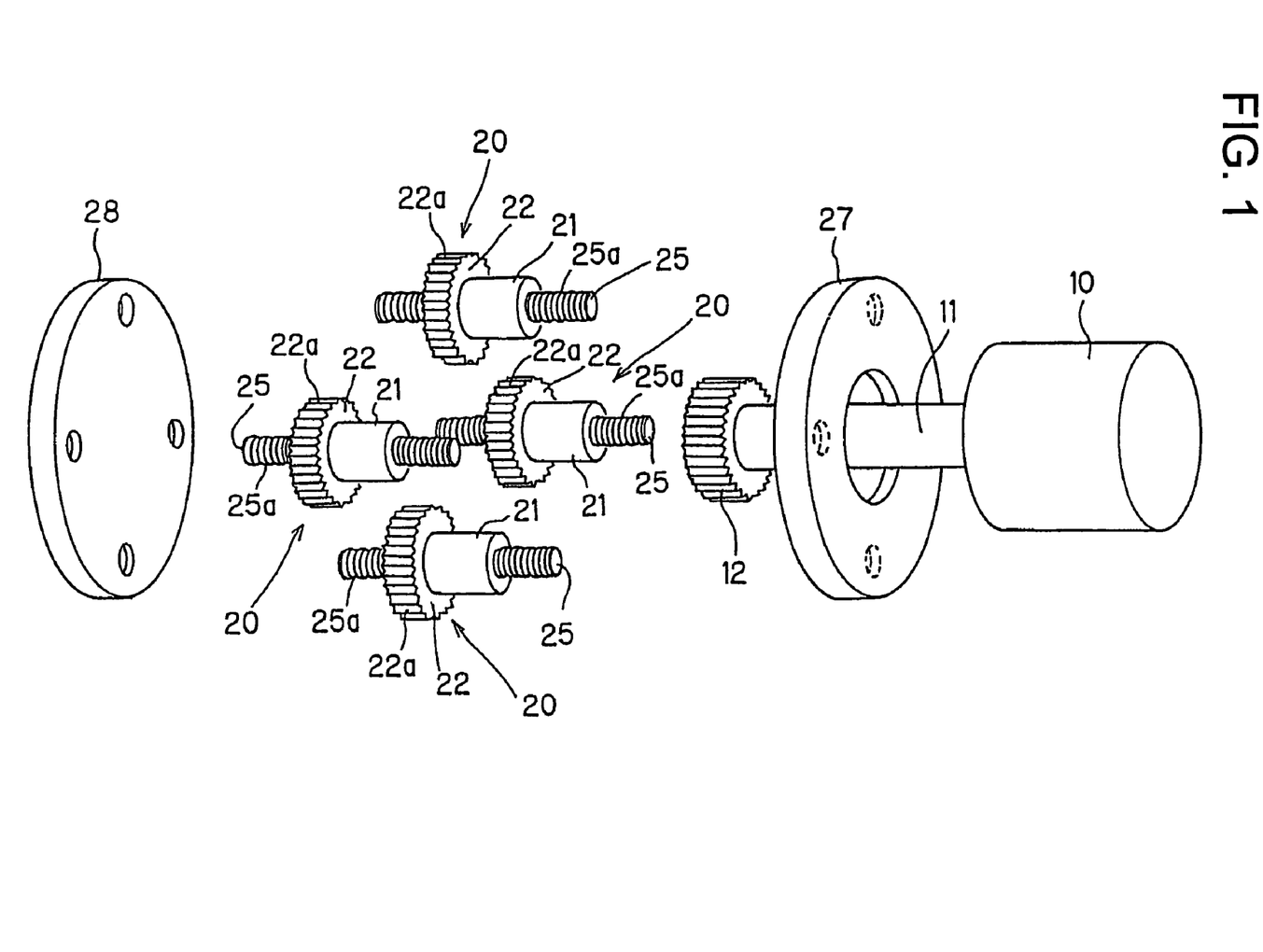
FIG. 1 is a developed perspective view for explaining an operational principle of a thrust transfer device according to a first embodiment of the present invention, in which an outer appearance of main structural parts are shown by disassembling the device.
Figure 2:
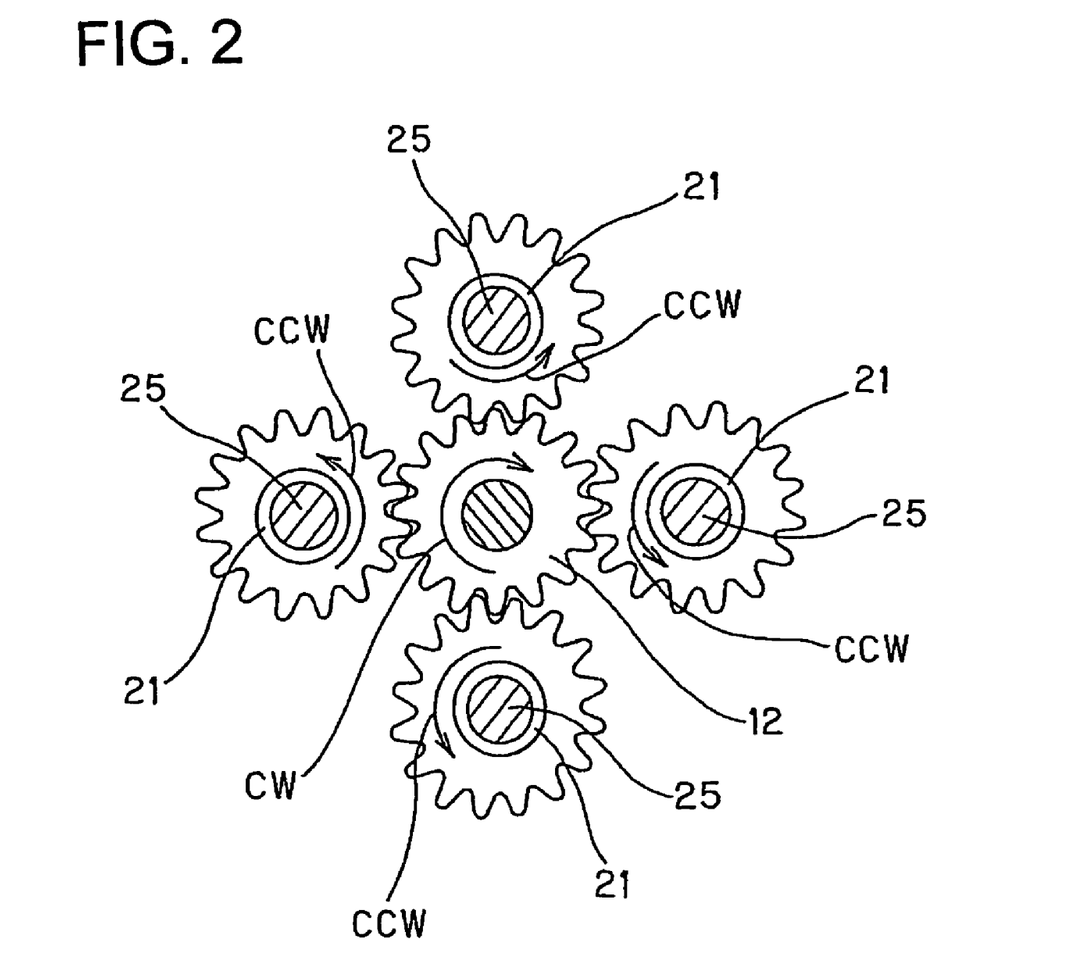
FIG. 2 is a cross sectional side view for explaining an operational principle of the thrust transfer device of the first embodiment, in which only main parts to which power is transferred are shown.

The thrust transfer device of the first embodiment includes, as shown in FIG. 1, a motor 10 as a driving source, and the motor 10 has a motor shaft 11 to which a sun gear 12 is mounted to be rotatable. Around the sun gear 12, four ball screws 20 are disposed so as to surround the sun gear 12. Each of these four ball screws 20 is composed of a nut member 21 and screw shaft 25.

The nut member 21 is provided with a flange 22 having an outer peripheral surface to which an external tooth 22a is formed so as to be meshed with the sun gear 12. Accordingly, when the sun gear 12 is driven by the motor 10, the nut member 21 meshed with the sun gear 12 is rotated at the mounted position. Further, the nut member 21 is formed, on its inner peripheral surface, with a nut side spiral screw groove, not shown.

On the other hand, the screw shaft 25 is formed, on its outer peripheral surface, with a screw side spiral screw groove 25a so as to correspond to the nut side screw groove, not shown. The screw side screw groove 25a is fitted to the nut side screw groove through a plurality of balls. When the screw shaft 25 is inserted into and engaged with the nut member 21, the screw shaft is reciprocally moved in accordance with the rotating motion of the nut member 21. The plural balls existing between the screw side screw groove 25a and the nut side screw groove are endlessly circulated between the nut member 21 and the screw shaft 25 by a circulation mechanism provided for the nut member 21.

Furthermore, one sheet of auxiliary plate 27 is fixed to motor side end portions of the four screw shafts 25 on the one hand, and one sheet of pressing plate 28 is fixed to reverse side end portions of the four screw shafts 25 on the other hand. According to this arrangement, when the sun gear 12 is driven and rotated by the motor 10, four nut members 21 are rotated, and according to this rotating motion of the nut members 21, the four screw shafts 25 are reciprocally moved in the axial direction. The thrust generated by the reciprocating motion of these four screw shafts 25 is transferred through the pressing plate 28.

Herein, detailed operation of the thrust transfer device according to the first embodiment will be described with reference to FIG. 2. When the sun gear 12 is rotated in an arrowed direction CW (clockwise direction), the four nut members 21 disposed so as to surround the sun gear 12 are rotated in arrowed directions CCW (counter clockwise direction). Further, the screw side screw groove 25a in a general screw shaft is composed of a right-threaded screw (right turn groove), so that when the nut member 21 is rotated in the counter clockwise direction, the screw shaft 25 is moved in a direction opposite to the motor side (refer to FIG. 1).

Of course, it is possible to be driven in a direction reverse to that shown in FIG. 2, and when the sun gear 12 is rotated in the counter clockwise (CCW) direction, the four nut members 21 are rotated in the clockwise (CW) direction, respectively, to thereby move the screw shaft 25 on the motor side. According to the structure mentioned above, a thrust transfer device realizing high power generation can be provided.

(Specific Device Structure)

Figure 3:
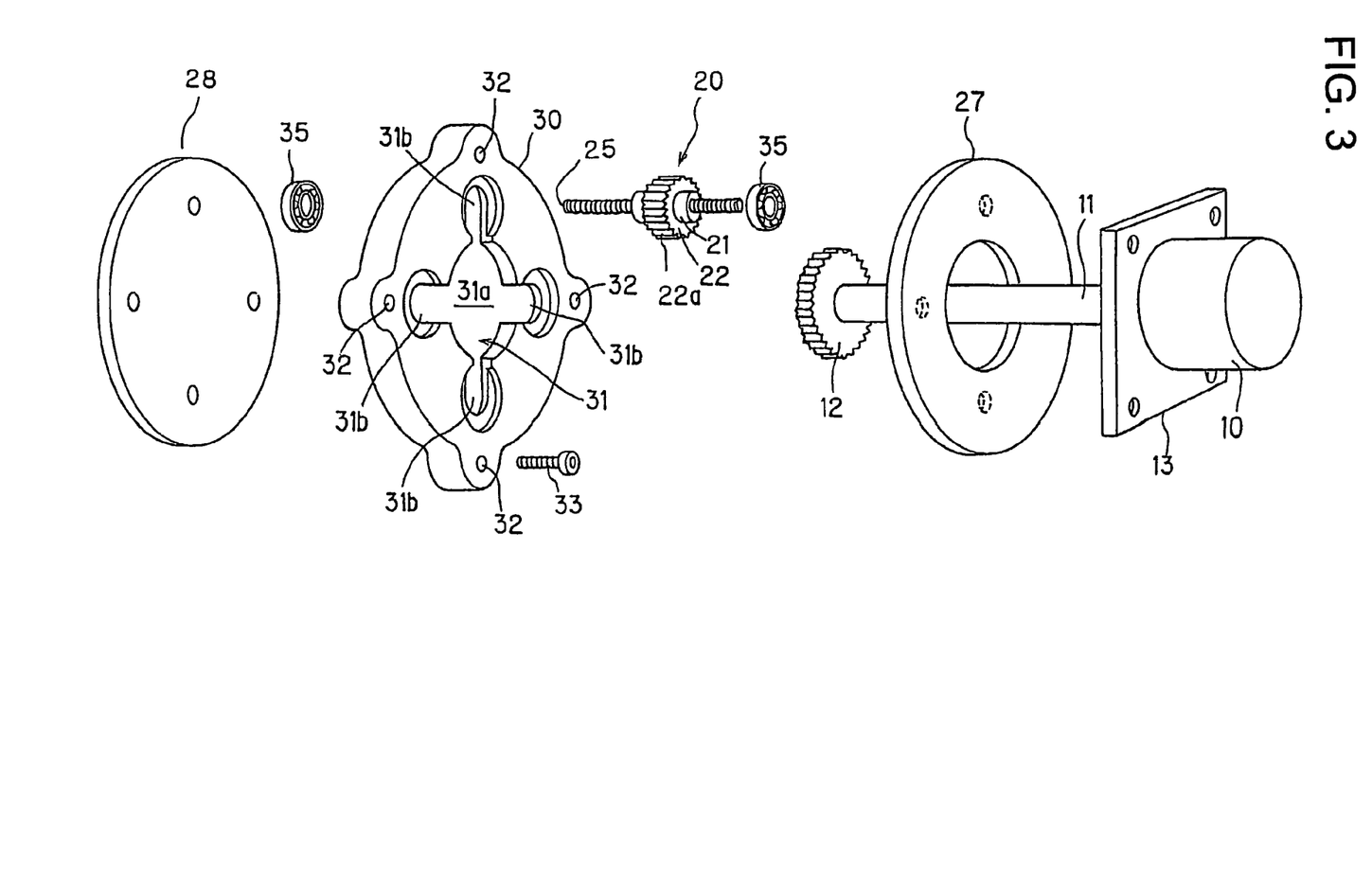
FIG. 3 is a developed perspective view for explaining specific structure of the thrust transfer device according to the first embodiment.
Figure 4:
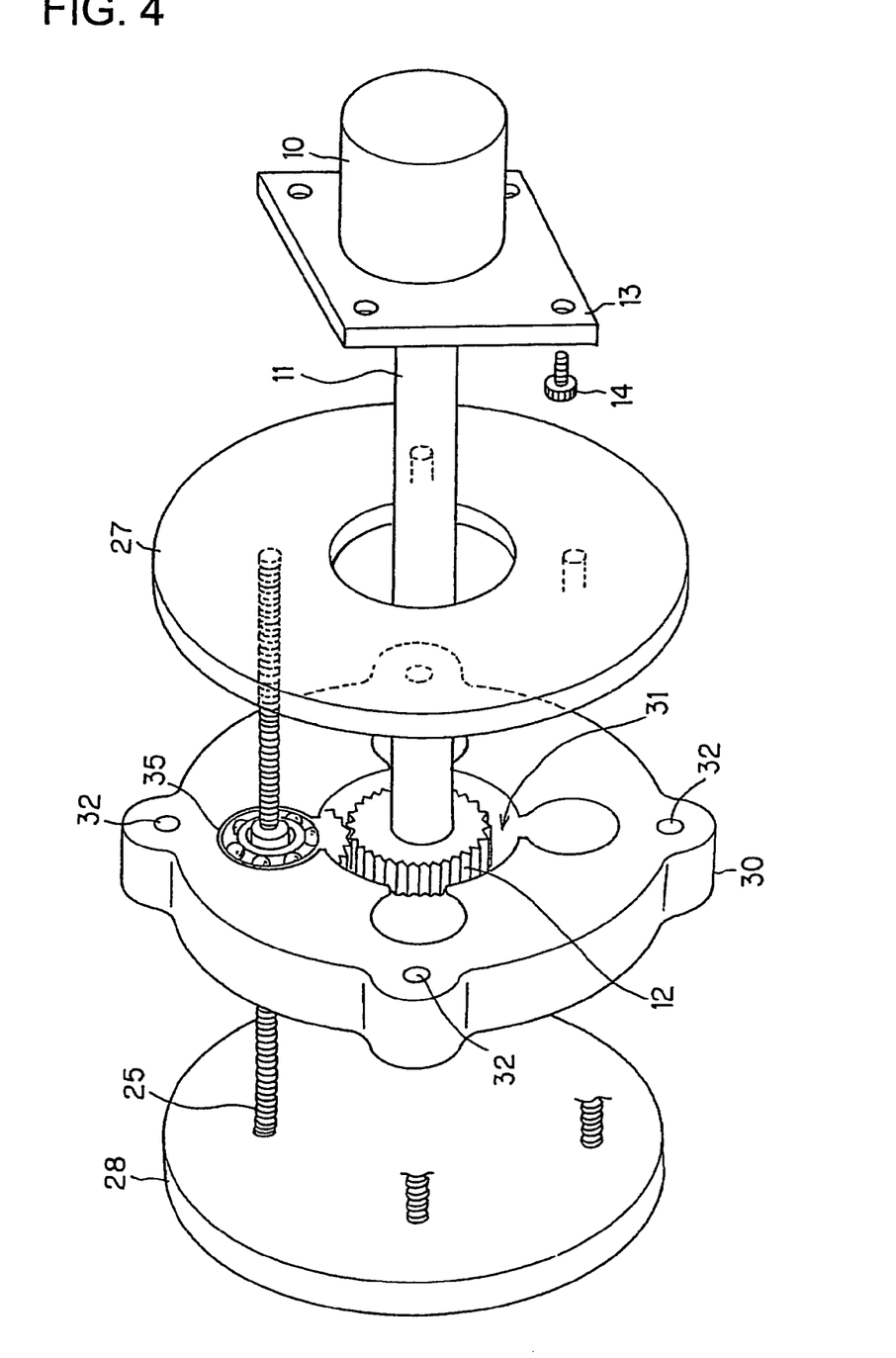
FIG. 4 is a perspective view showing an outer appearance of an entire structure of the thrust transfer device according to the first embodiment.

Hereinabove, the operational principle of the thrust transfer device according to the first embodiment was described. Hereunder, with reference to FIGS. 3 and 4, a specific device structure for realizing the thrust transfer device according to the present invention will be described. FIG. 3 is a developed perspective view for explaining the specific device structure of the thrust transfer device according to the first embodiment. FIG. 4 is a view showing outer configuration of the entire structure of the thrust transfer device according to the first embodiment. Further, explanations of members or like explained by using the same or like reference numerals in FIGS. 1 and 2 may be eliminated herein.

As shown in FIG. 3, the thrust transfer device according to the first embodiment is provided with a housing 30 for accommodating the four ball screws 20. A through hole 31 substantially in cross shape is formed to a central portion in the housing 30 so that the sun gear 12 is disposed at a central portion 31a of this through hole 31. Further, the cross-shaped through hole 31 has four tip end portions 31b to which the four ball screws 20 are fitted, respectively.

The nut member 21 provided for the ball screw 20 has a structural feature such that a flanged portion 22 is formed at the central portion of the nut member 21. The nut member 21 is fitted into the tip end portion 31b of the through hole 31 in a state in which a bearing 35 is provided on both sides of the flanged portion 22, so that the nut member 21 is meshed with the sun gear 12 in the housing in a manner to be rotatable.

The thrust transfer device of the structure mentioned above according to the first embodiment is embodied by a device structure shown in FIG. 4. When the sun gear 12 is driven and rotated by driving the motor 10, the nut member 21 meshed with the sun gear 12 is rotated reciprocally, and the screw shaft 25 is hence reciprocally moved in accordance with this rotating motion of the nut member 21. Therefore, the thrust generated by the reciprocating motion of the screw shaft 25 is transferred through the pressing plate 28. According to the thrust transfer device of the first embodiment, since the structure provided with four ball screws 20, each existing type, is adopted, it is possible to provide the thrust transfer device realizing high speed and high power requirements with reduced manufacturing costs.

Further, the housing 30 is fixed to a desired position by screwing bolts 33 with screw holes 32 formed at four corner portions thereof. In addition, the motor 10 is positioned fixedly to a desired position by screwing bolts 14 to a mounting plate 13.

Hereinabove, although the thrust transfer device according to the first embodiment of the present invention is described with reference to FIGS. 1 to 4, the technical scope of the present invention is not limited to the description of this first embodiment, and many other changes and modifications may be applied to the first embodiment.

For example, in the described first embodiment, there is explained the example in which the screw shaft 25 and the nut member 21 provided for the ball screw 20 are fitted together by means of a plurality of rolling members (balls). However, it may be possible to provide the direct fitting of the nut member 21 to the screw shaft 25 without interposing the balls. In addition, a plurality of rollers may be disposed in place of a plurality of balls. Furthermore, in the first embodiment, although the arrangement of the four ball screws are provided, the number of the ball screws may be optionally changed in accordance with a power to be required.

Furthermore, in the ball screw 20 of the first embodiment, there is adopted the structure in which the flanged portion 22 is formed to the nut member 21, and the external tooth 22a is formed to the outer peripheral surface of the flanged portion 22. However, it may be possible to directly form the external tooth 22a to the surface of the nut member 21 without forming the flanged portion 22. Such modified examples and changes may be within the technical scope of the present invention from the recitation in the appended claims.

Second Embodiment

In the described first embodiment, four ball screws 20 are driven at respective setting positions. In this second embodiment, there is explained an example in which a plurality of ball screws are driven while performing a planetary motion.

(Operational Principle)

First, with reference to FIGS. 5 and 6, an operational principle of a thrust transfer device according to the second embodiment will be explained. Herein, FIG. 5 is a view for explaining an operational principle of the thrust transfer device according to the second embodiment, which is a developed perspective view of an outer configuration of main constitutional elements, and FIG. 6 is a view for explaining an operational principle of the thrust transfer device of the second embodiment, which is a cross sectional side view only showing a main portion to which a power is transferred.

Figure 5:
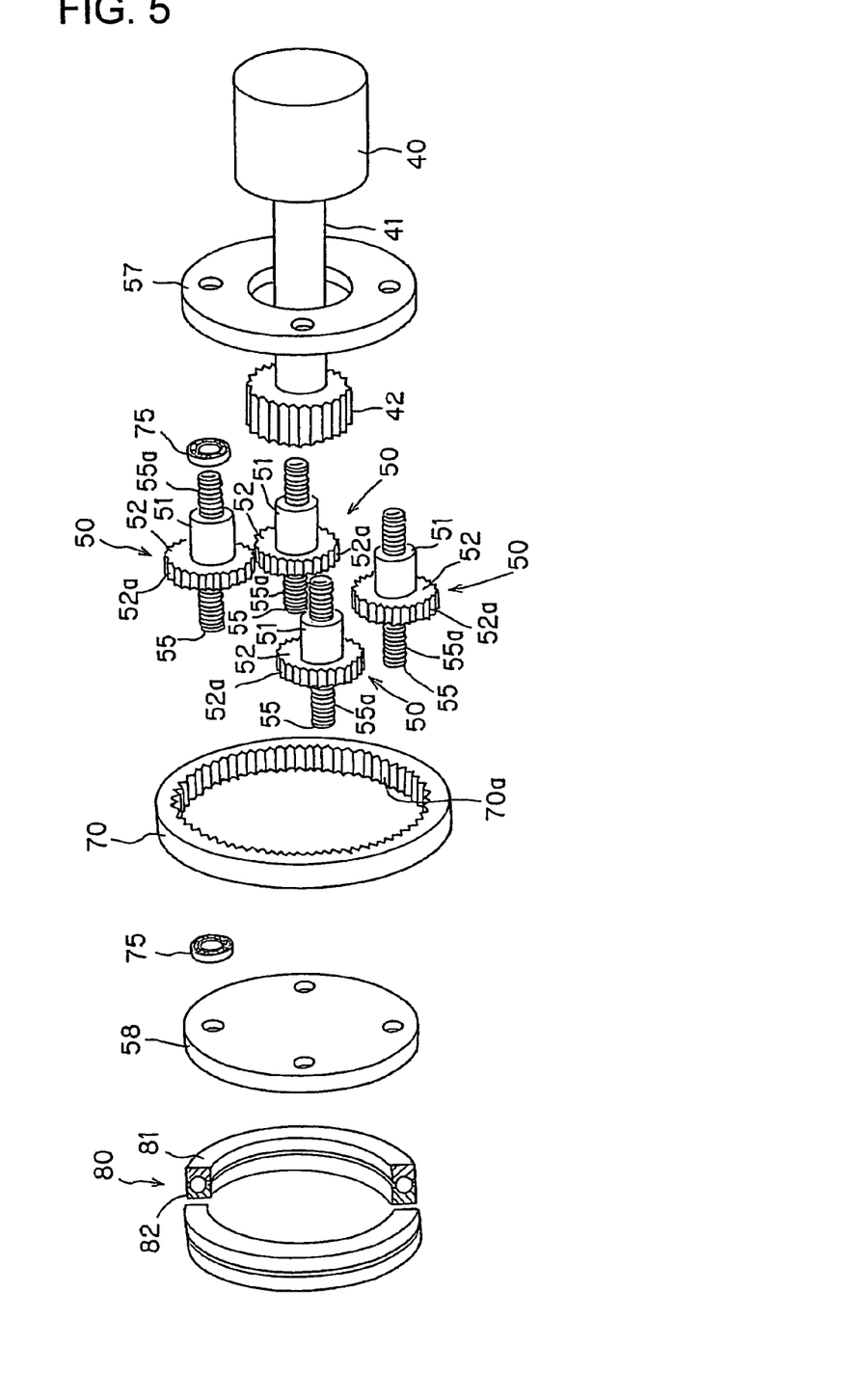
FIG. 5 is a developed perspective view for explaining an operational principle of a thrust transfer device according to a second embodiment of the present invention, in which an outer appearance of main structural parts are shown by disassembling the device.
Figure 6:
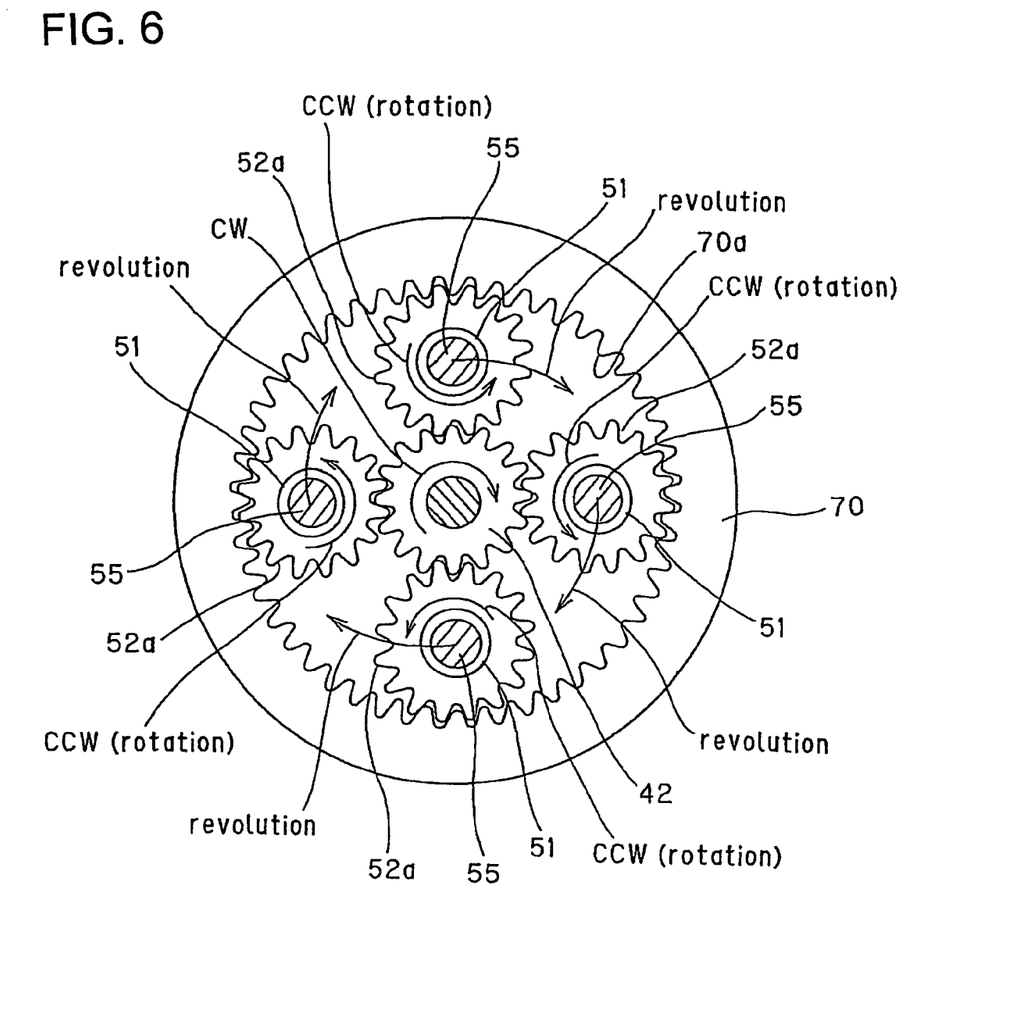
FIG. 6 is a cross sectional side view for explaining an operational principle of the thrust transfer device of the second embodiment, in which only main parts to which power is transferred are shown.

The thrust transfer device of this second embodiment is, as shown in FIG. 5, provided with a motor 40 as a driving source, and a sun gear 42 is rotatably mounted to a motor shaft 41 of the motor 40. Four ball screws 50 are arranged around the sun gear 42 so as to surround the same. Each of these four ball screws 50 includes a nut member 51 and a screw shaft 55. In addition, an internal tooth gear 70 provided with an internal tooth 70a to be meshed with an external tooth 52a of the nut 51 is arranged outside the four ball screws 50.

The nut member 51 has a flanged portion 52 formed with the external tooth 52a at its outer peripheral surface, and the external tooth 52a is formed so as to surround the sun gear 42 and meshed therewith. Further, the internal tooth gear 70 is formed to the outer periphery of the nut member 51 in a manner such that the external tooth 52a of the nut member 52 and the internal tooth 70a of the internal tooth gear 70 are meshed with each other. According to this structure, when the sun gear 42 is rotated by driving the motor 40, the nut member 51 meshed with the sun gear 42 carries out the planetary motion. That is, the nut member 51 rotates in the internal tooth gear 70 while revolving by the rotating force of the sun gear 42. Further, the nut member 51 is formed, at its inner peripheral surface, with a nut side spiral screw groove, not shown.

On the other hand, the screw shaft 55 is formed, on its outer peripheral surface, with a screw side spiral screw groove 55a corresponding to the nut side screw groove, not shown, and this screw side screw groove 55a is fitted to the nut side screw groove via a plurality of balls. The screw shaft 55 is inserted through the nut member 51, and accordingly, the screw shaft 55 is reciprocally moved while revolving in accordance with the planetary motion of the nut member 51. Further, the balls existing between the screw side screw groove 55a and the nut side screw groove circulate endlessly between the nut members 51 and the screw shafts 55 by a circulation mechanism provided for the nut members 51.

Furthermore, one auxiliary plate 57 is disposed, through a bearing 75, at the end portion on the motor side of the four screw shafts 55, and one pressing plate 58 is also disposed, through a bearing 75, at the other end portion thereof. Accordingly, when the sun gear 42 is driven by the motor 40, the four nut members 51 perform the planetary motion, by which the four screw shafts 55 are reciprocally moved in the axial direction while performing the revolving motion. Further, since the auxiliary plate 57 and the pressing plate 58 are disposed through the bearings 75 with respect to the four screw shafts 55, they perform the reciprocating motion while being rotated.

Still furthermore, a thrust bearing 80 is provided on a surface opposite to the screw shaft connecting surface of the pressing plate 58, and one of track races 81 of this thrust bearing 80 is fixedly disposed to the pressing plate 58 and another track race 82 thereof is free from restriction. Accordingly, one track race 81 absorbs the rotating motion generated by the planetary motion of the four nut members 51, and the other track race 82 transfers only the thrust generated by the reciprocating motion of the screw shafts 55. That is, among the revolving motion and reciprocating motion transferred by the four screw shafts 55, only the reciprocating motion can be transferred externally by the function of the thrust bearing 80.

Herein, with reference to FIG. 6, the detailed operation and function of the thrust transfer device according to the second embodiment will be described.

When the sun gear 42 is rotated in the arrowed direction (clockwise direction CW), the four nut members 51 arranged so as to surround the periphery of the sun gear 42 and to be surrounded by the internal gear wheel 70 are revolved in the direction arrowed with "revolution" while rotating in the arrowed counter clockwise direction (CCW (rotation)). Here, in a general screw shaft 55, the screw side screw groove 55a is formed from right-turned thread (groove has right turns), so that when the nut members 51 are revolved in the internal tooth gear 70 while rotating in the counter clockwise direction, the screw shafts 55 is moved transversely on the side reverse to the motor (10) side while revolving (refer to FIG. 5).

Of course, the sun gear 42 may be driven in a direction reverse to the direction shown in FIG. 6. When the sun gear 42 is rotated in the counter clockwise direction (CCW), the four nut members 51 revolve in the direction reverse to the arrowed direction shown with "revolution" while being rotated in the clockwise direction (CW), and the screw shafts 55 moves transversely on the motor (40) side while revolving. According to the structure mentioned above, a thrust transfer device realizing high speed requirement and high power requirement can be obtained.

(Specific Structure of Device)

Figure 7:
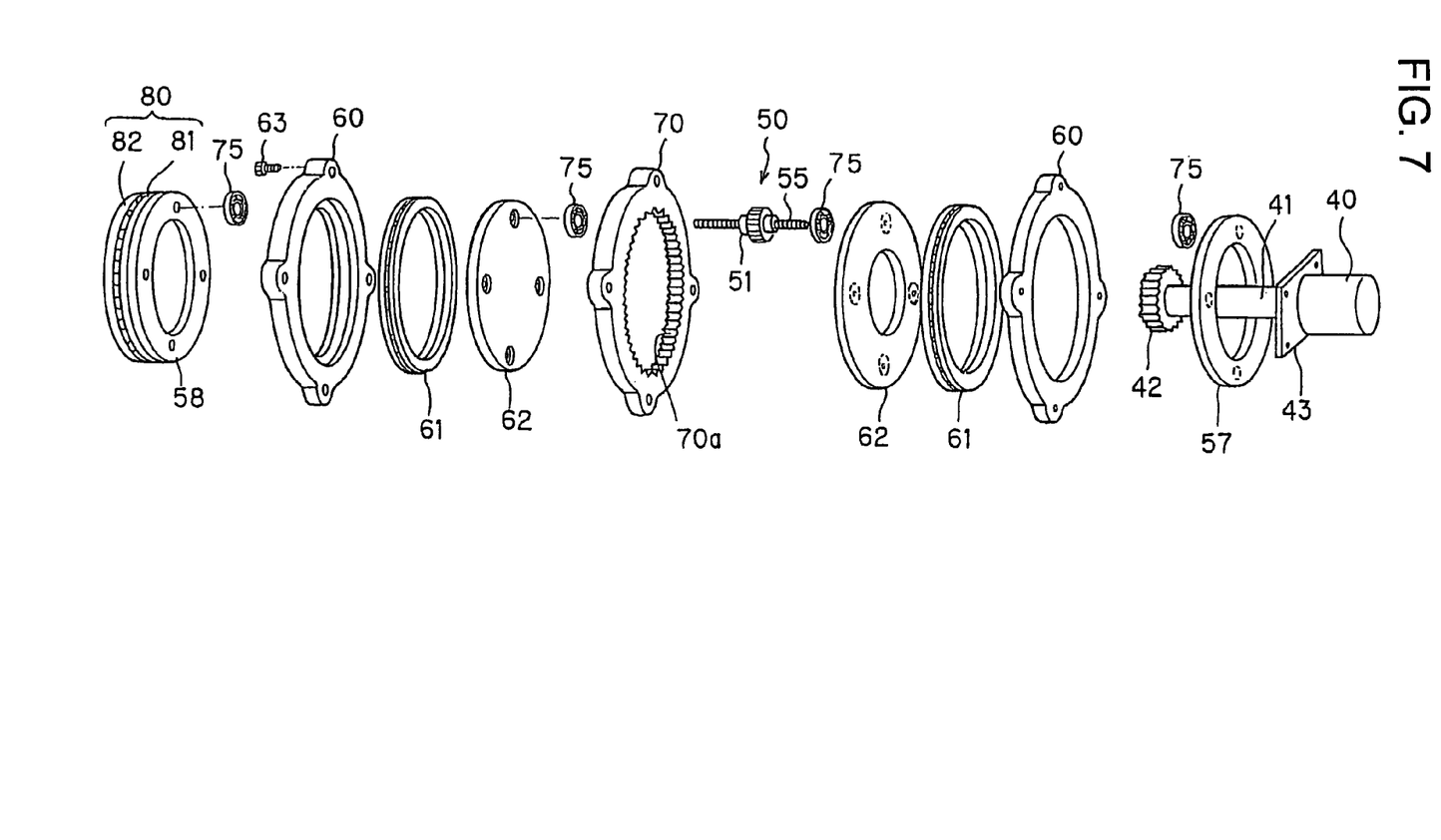
FIG. 7 is a developed perspective view for explaining specific structure of the thrust transfer device according to the second embodiment.
Figure 8:
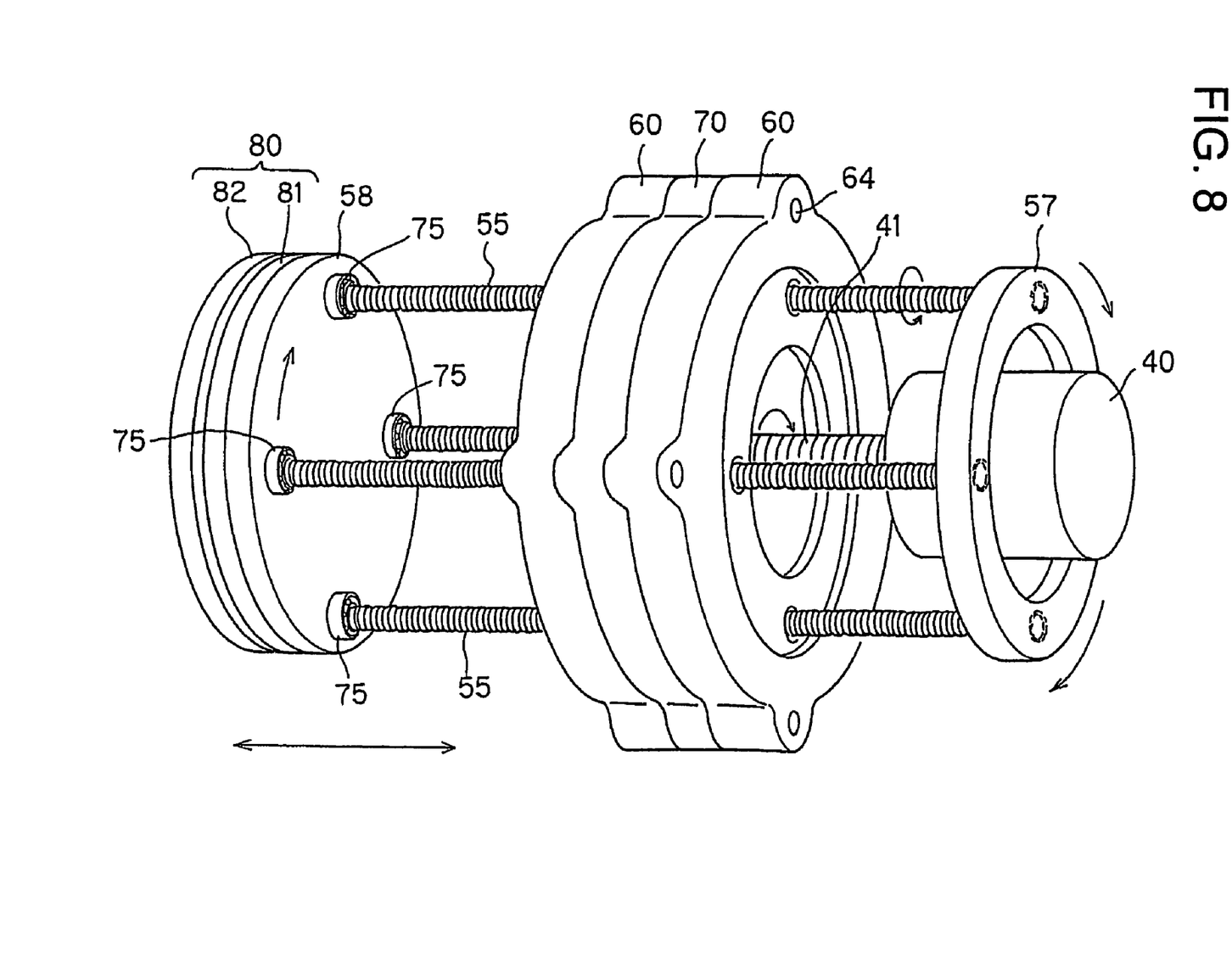
FIG. 8 is a perspective view showing an outer appearance of an entire structure of the thrust transfer device according to the second embodiment.

Hereinabove, the operational function of the thrust transfer device according to the second embodiment was described. Next, the specific structure of the device for realizing the thrust transfer device according to the second embodiment will be explained with reference to FIGS. 7 and 8, in which FIG. 7 is a developed perspective view for explaining specific structure of the thrust transfer device according to the second embodiment, and FIG. 8 is a perspective view showing an outer appearance of an entire structure of the thrust transfer device according to the second embodiment. Further, same reference numerals are added to the same or like members as those described with reference to FIGS. 5 and 6, and detailed explanations thereof may be omitted herein.

As shown in FIGS. 7 and 8, the thrust transfer device according to the second embodiment is provided with two housings 60 so as to snap both sides of four ball screws 50 arranged so as to revolve in the internal tooth gear 70. Two thrust bearings 61 are disposed outside in the lateral direction in FIG. 7 between the two housings 60 and the internal tooth gear 70, and two support plates 62 are also disposed inside in the lateral direction therebetween. Particularly, the support plates 62 are connected to be rotatable through the nut member 51 and the bearing 75 of the ball screw 50. The two housings 60 accommodate inside, in association with the internal tooth gear 70 positioned centrally, two thrust bearings 61, two support plates 62 and four ball screws 50 in the state of supporting these members 50, 61 and 62 to be rotatable. Further, in the thrust transfer device of the second embodiment, the two housings 60 and the internal tooth gear 70 are fixedly connected to each other by fastening means such as bolts 63.

The screw shaft 55 provided for the ball screw 50 penetrates the two support plates 62 and also penetrates the openings of the two thrust bearings 61 and two housings 60. One auxiliary plate 57 is disposed, through a bearing 75, to the motor side end portion of the four screw shafts 55, and one pressing plate 58 is disposed, through the bearing 75, to the other side end plate of the four screw shafts 55. In addition, a thrust bearing 80 is disposed to a surface opposite to the connection surface of the screw shaft 55 of the pressing plate 58. One of the track races 81 of the thrust bearing 80 is fixed to the pressing plate 58 and the other tracking race 82 is free from restriction.

According to the structure mentioned above, in the thrust transfer device of the second embodiment, when the sun gear 42 is rotated by the operation of the motor 40, the four nut members 51 performs the planetary motion, and according to this planetary motion of the nut member 51, the four screw shafts 55 is reciprocally moved in the axial direction while revolving. At this time, inside the housing 60, the two support plate 62 and the two thrust bearings 61 are rotated together in association with the motion of the ball screw 50. The auxiliary plate 57 and the pressing plate 58 are provided through the four screw shafts 55 and the bearings 75, so that they are reciprocally moved while being rotated. Further, in the thrust bearing 80 coupled to the pressing plate 58, one of the track races 81 absorbs the rotational motion generated by the planetary motion of the four nut members 51, and the other one of the track races 82 transfer only the thrust generated by the reciprocating motion of the four screw shafts 55. Accordingly, only the reciprocating motion of the revolving motion and the reciprocating motion transferred by the four screw shafts 55 is externally transferred as the thrust.

The thrust transfer device according to the second embodiment of the structure mentioned above will be specified by a device of the structure shown in FIG. 8, in which when the sun gear 42 is rotated by the operation of the motor 40, the nut members 51 meshed between the sun gear 42 and the internal tooth gear 70 perform the planetary motion, and in accordance with this planetary motion, the screw shafts 55 reciprocally move while revolving. Further, the revolving motion of the screw shaft 55 is absorbed by the thrust bearing 80 formed as an operating portion, so that the thrust generated by the reciprocating motion of the screw shaft 55 is transferred through the other, i.e., outside, track race 82 of the thrust bearing 80. Therefore, according to the thrust transfer device of the second embodiment, since the structure in which existing type four ball screws 50 is adopted, the high speed requirement and the high power requirement can be realized with reduced manufacturing cost.

Further, the provision of the housings 60 and the motor 40 of this second embodiment may be realized by adopting the screw holes 64 provided for the housings 60 or existing mounting means.

Hereinabove, although the thrust transfer device according to the second embodiment was described, the technical scope of the present invention is not limited to the scope of this second embodiment, and many other changes and modifications may be applied to this second embodiment.

For example, in the second embodiment, there was described the example in which the member, serving as functioning member, connected to the end portion opposite to the motor side of the four screw shafts 55 is composed of the two members of the pressing member 58 and the thrust bearing 80. However, this functioning member may be composed of only the thrust bearing 80, and in this case, the four screw shafts 55 may be directly connected to the track race 81 of one of the thrust baring 80. Further, in such connection, since the four screw shafts 55 are rotated while revolving, it is of course necessary to be connected through the bearing 75.

In addition, in the second embodiment as like as in the first embodiment, there was described the example in which the screw shaft 55 and the nut member 51 provided for the ball screw 50 are fitted through a plurality of rolling members, i.e., balls. However, the nut member 51 and the screw shaft 55 may be directly fitted without interposing any ball. A plurality of rollers may be also replaced for the balls. Moreover, in the second embodiment, the four ball screws 50 are arranged, the number of the ball screws may be changed in accordance with a demand of a power to be generated.

Still furthermore, in the ball screw 50 according to the second embodiment, there is adopted a structure in which the flanged portion 52 is provided for the nut member 51 and the external tooth 52a is formed to the outer peripheral surface of the flanged portion 52. However, it is not necessary for the ball screw 50 to be provided with the flanged portion 52, and the external tooth 52a may be directly formed to the surface of the nut member 51. It is apparent from the scope of the appended claims that these modifications may be within the technical range of the present invention.

Third Embodiment

A thrust transfer device according to the third embodiment of the present invention will be described hereunder. This thrust transfer device corresponds to that of the second embodiment mentioned above to which some improvement is made. According to the thrust transfer device of this embodiment, the high speed requirement and high power requirement can be realized, and in addition, the speed and power can be controlled to desired values.

(Operational Principle)

Figure 9:
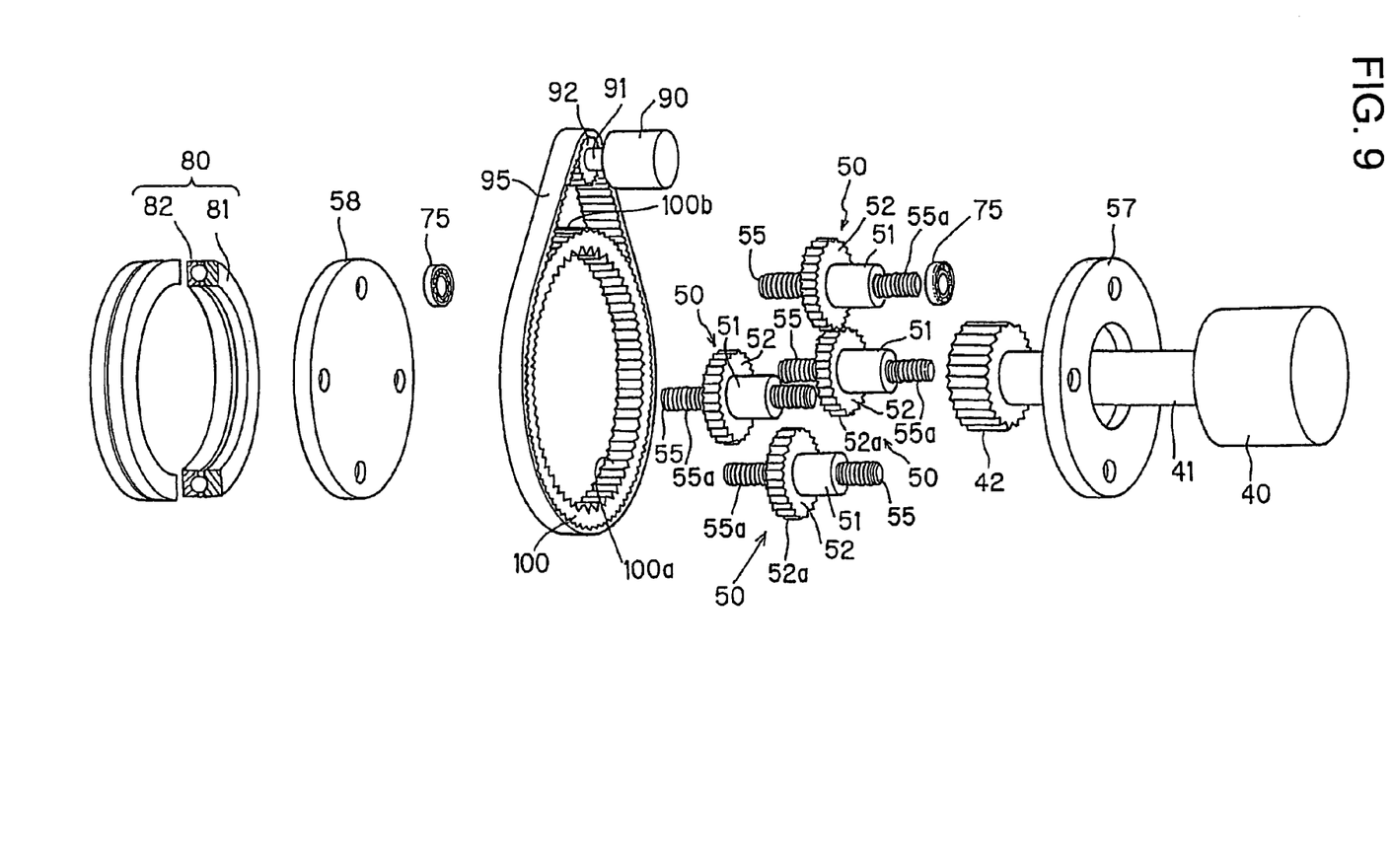
FIG. 9 is a developed perspective view for explaining an operational principle of a thrust transfer device according to a third embodiment of the present invention, in which an outer appearance of main structural parts are shown by disassembling the device.
Figure 10:
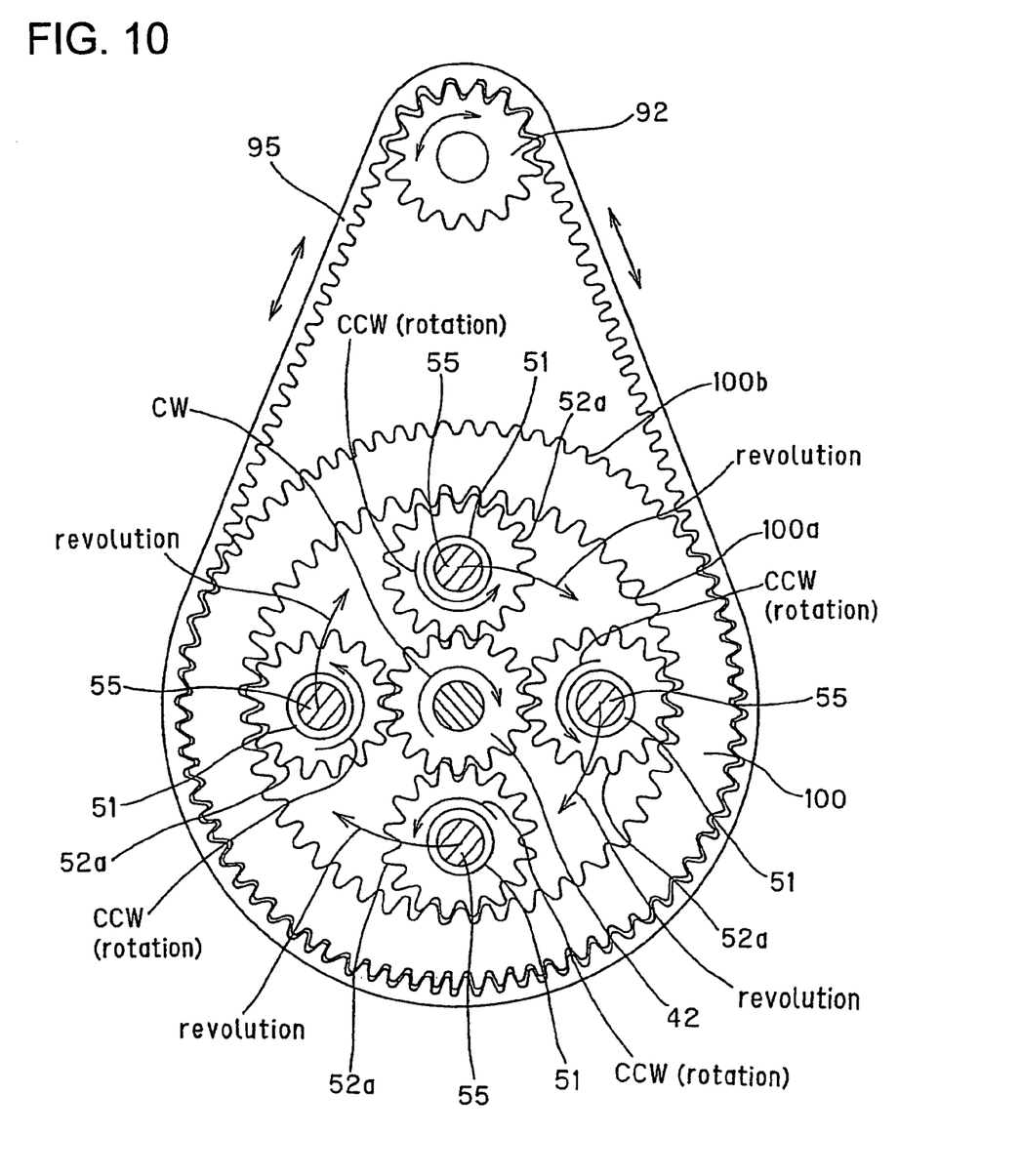
FIG. 10 is a cross sectional side view for explaining an operational principle of the thrust transfer device of the third embodiment, in which only main parts to which power is transferred are shown.

First, with reference to FIGS. 9 and 10, the operational principle of the thrust transfer device of the third embodiment will be described. Herein, FIG. 9 is a view for explaining the operational principle of the thrust transfer device of the third embodiment, and specifically, is a developed perspective view showing an outer configuration of main constitutional elements. FIG. 10 is also a view for explaining the operational principle of the thrust transfer device of the third embodiment, and specifically, is a side view of the elevational section of the main components for transferring the power.

The specific features or points of the thrust transfer device of the third embodiment reside in, as shown in FIG. 9, that an external tooth 100b for control is formed to the outer periphery of a member (internal tooth gear 100) corresponding to the internal tooth 70 explained with reference to the thrust transfer device of the second embodiment, and a motor 90 for control and a gear 92 for control mounted to be rotatable on the motor shaft 91 provided for the motor 90 are arranged so that the external tooth 100b and the gear 92 are connected to each other through a geared belt 95.

According to such structure, the driving force of the motor 90 for control can be transferred to the internal tooth gear 100, so that the thrust generated by the reciprocating motion of the screw shaft 55 can be freely controlled.

Next, with reference to FIG. 10, the operational principle of the thrust transfer device of the third embodiment will be described.

When the sun gear 42 is rotated in the arrowed direction (clockwise direction) shown with "CW", the four nut members 51 arranged so as to surround the sun gear 42 and surrounded by the internal tooth gear 100 revolve in the arrowed direction (revolution direction) while being rotated in the arrowed direction (CCW, rotation direction). Here, in the general screw shaft 55, since the screw side screw groove 55a is formed with a right-threaded screw (right turn groove), when the nut members 51 revolve inside the internal tooth gear 100 while being rotated in the counter clockwise direction, the screw shafts 55 are moved transversely to the side reverse to the motor side while revolving (see FIG. 9).

Further, it may be possible to rotate in a direction reverse to that shown in FIG. 10, and when the sun gear 42 is rotated in the counter clockwise (CCW) direction, the four nut members 51 revolve in a direction reverse to the arrowed direction (revolution direction) while being rotated in the clockwise (CW) direction, and the screw shafts 55 are moved transversely on the motor (40) side while revolving.

By meshing the geared belt 95 with the external tooth 100b for control of the internal tooth gear 100 performing the rotational motion by the mechanism mentioned above and connecting the gear 92 for control through such geared belt 95, the rotating driving force of the motor 90 for control can be transferred to the internal tooth gear 100. Then, by adjusting the driving force of the motor 90 for control or adjusting balance between the motor 40 and the control motor 90, there can be provided a thrust transfer device capable of realizing the high speed requirement and the high power requirement, and in addition, capable of controlling these speed and power to the desired values.

(Specific Structure of Device)

Figure 11:
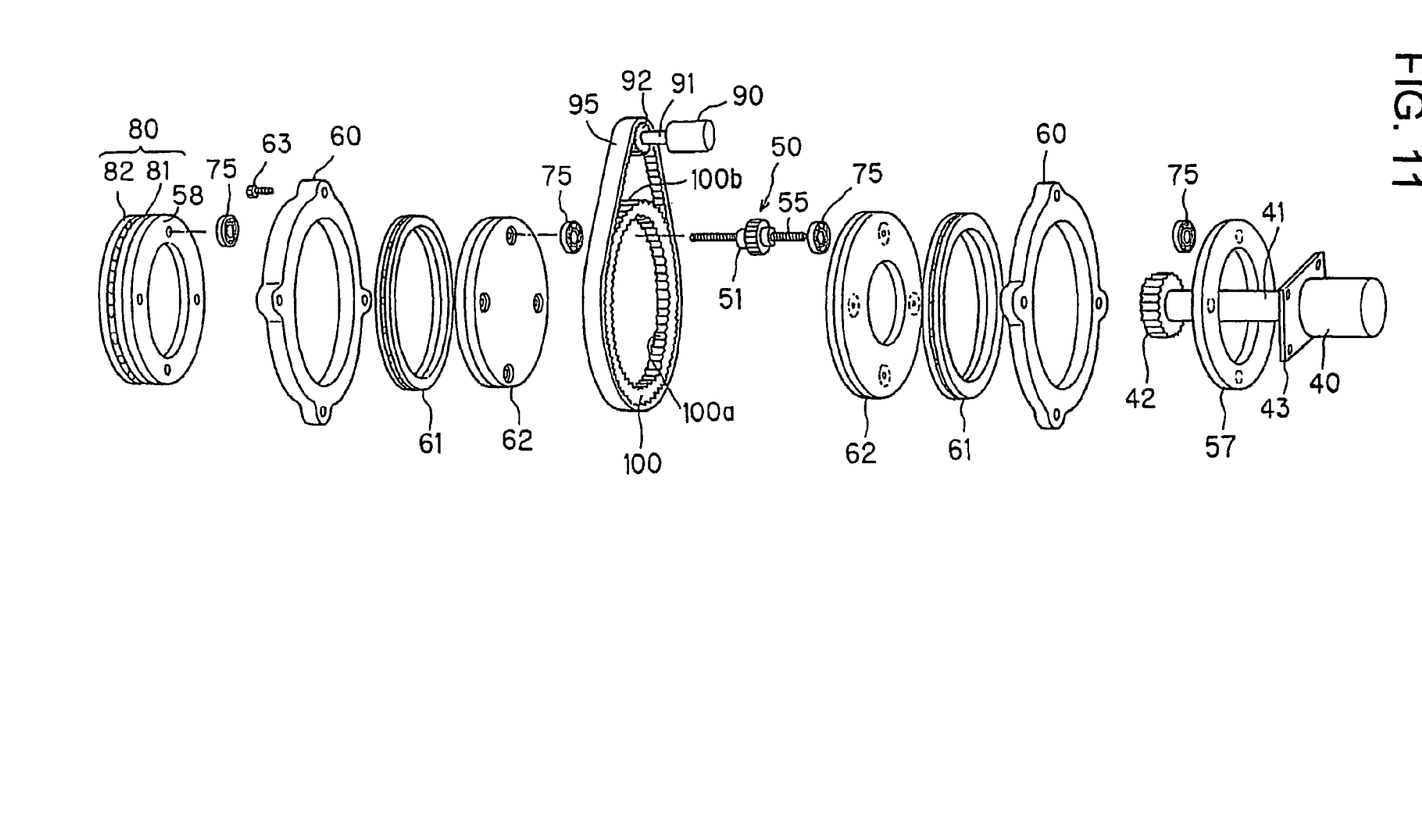
FIG. 11 is a developed perspective view for explaining specific structure of the thrust transfer device according to the third embodiment.
Figure 12:
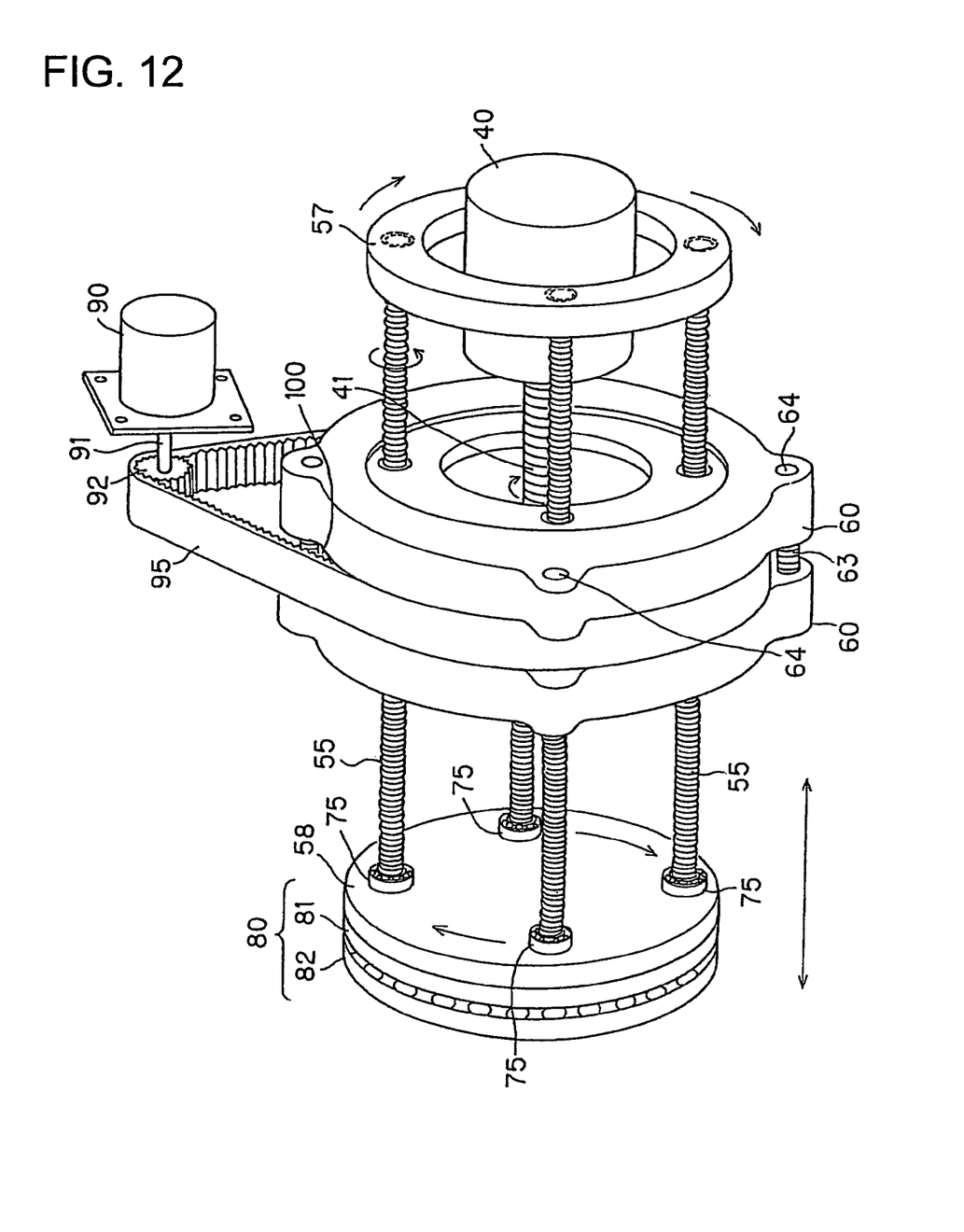
FIG. 12 is a perspective view showing an outer appearance of an entire structure of the thrust transfer device according to the third embodiment.

Hereinabove, the operational principle of the thrust transfer device of the third embodiment of the present invention was described. Next, hereunder, specific structure of the device for realizing the thrust transfer device of the third embodiment will be described. Herein, FIG. 11 is a developed perspective view for explaining the specific structure of the thrust transfer device of the third embodiment, and FIG. 12 is a perspective view showing the outer configuration of the entire structure of the thrust transfer device of the third embodiment. Further, the same or similar members as or to the members explained with reference to FIGS. 9 and 10 are added with the same reference numerals, and the explanation thereof is omitted herein.

As shown in FIGS. 11 and 12, in the thrust transfer device of the third embodiment, there is adopted a structure in which the external tooth 100b for control is formed to the outer periphery of the internal tooth gear 100, and this external gear 100b is connected to the gear 92 driven by the control motor 90 through the geared belt 95. Accordingly, in the thrust transfer device of the third embodiment, all the members 50, 51, 100 in the two housings 60 are arranged to be rotatable.

Therefore, according to the thrust transfer device of the third embodiment, when the sun gear 42 is rotated by the motor 40, the four nut members 51 perform the planetary motion, and according to this planetary motion of the nut members 51, the four screw shafts 55 move reciprocally in the axial direction while revolving. At this time, in the housings 60, the two support plates 62 and the two thrust bearings 61 are both rotated in association with the ball screws 50. Furthermore, in this state, the internal gear 100 takes a non-restricted position, and the four ball screws 50 are allowed to perform the planetary motion on its inner peripheral surface. Since the auxiliary plate 57 and the pressing plate 58 are disposed to the four screw shafts 55 through the bearings 75, they are moved reciprocally while being rotated. Further, in the thrust bearing 80 connected to the pressing plate 58, one of the track races 81 absorbs the rotating motion generated by the planetary motion of the four nut members 51 and, on the other hand, the other one of the track races 82 transfers only the thrust force generated by the reciprocating motion of the four screw shafts 55. Accordingly, only the reciprocating motion in the revolving motion and the reciprocating motion transferred by the four screw shafts 55 can be transferred externally as the thrust by the operation of the thrust bearing 80.

In the thus driven thrust transfer device of the third embodiment, it becomes possible to control the transverse thrust applied from the thrust bearing 80 by controlling the driving of the control motor 90 to the desired value. More specifically, by driving the control motor 90, the internal tooth gear 100 is rotated in the direction reverse to the planetary motion of the nut member 51, and then, a force is applied in a direction substantially killing the rotational driving force of the motor 40. On the contrary, when the internal tooth gear 100 is rotated in the same direction as the planetary motion of the nut member 51 by driving the control motor 90, a force is applied in a direction for amplifying the rotational driving force of the motor 40. Accordingly, by controlling the control motor 90, the thrust can be optionally adjusted.

Further, as to this control motor 90, there may be adopted every type of motor such as a general AC or DC motor, an induction motor, a step motor, an ultrasonic motor, a linear motor or like. Specifically, the step motor, which may be called pulse motor, can perform an open-loop control with high performance, so that it is preferably applicable to the thrust transfer device of the third embodiment.

Furthermore, a preferred thrust control may be done by optionally selecting motor capacity of the motor 40 and the control motor 90. For example, when it is required to obtain high speed and high power, both the motors having large capacity will be selected, and on the other hand, when a fine speed control or power control is required, the control motor 90 having a capacity smaller than that of the motor 40 may be adapted. In addition, it may be possible to detect the thrust obtained by the thrust bearing 80 by a sensor or like and to perform feedback control of the control motor 90 on the basis of the thus detected data.

Further, although the thrust transfer device according to the third embodiment is specified by the device structure shown in FIG. 12, the screw holes 64 formed to the housings 60 or an existing mounting member may be adopted as mounting means of the thrust transfer device.

Further, it is to be noted that the present invention was explained hereinbefore with reference to the preferred embodiments described above, but the technical scope of the present invention is not limited to the descriptions of the embodiments, and it will be apparent from the scope of the appended claims that many other changes and modifications may be included in the technical scope of the present invention.

What is claimed is:

1. A thrust transfer device comprising:
   a motor serving as a driving source;
   a sun gear mounted to be rotatable to an output shaft of the motor,
   a plurality of nut members each provided, at an outer periphery thereof, with an external tooth meshed with the sun gear and provided with, on an inner peripheral surface thereof, with a nut side spiral screw groove;
   a plurality of screw shafts, each provided, at an outer periphery thereof, with a screw side spiral screw groove corresponding to the nut side spiral screw groove, and reciprocally moved in accordance with rotating motion of the nut member by fitting the screw side screw groove into the nut side screw groove; and
   an auxiliary plate fixed to one of side end portions of the plural screw shafts and a pressing plate fixed to another of the side end portions of the plural screw shafts,
   wherein thrust generated by the reciprocating motion of the screw shafts is transferred through the pressing plate, and
   wherein when the sun gear is rotated, the nut members are rotated, and according to the rotating motion of the nut members, the screw shafts are reciprocally moved in axial directions thereof.

2. The thrust transfer device according to claim 1, wherein the nut side screw grooves formed to the nut members and the screw side screw grooves formed to the screw shafts are fitted together through rolling members.

3. The thrust transfer device according to claim 1, further comprising an internal tooth gear meshed with the external tooth formed to each of the nut members,
   wherein when the sun gear is rotated, the nut members perform planetary motion inside the internal tooth gear, and according to the planetary motion thereof, the screw shafts are reciprocally moved in axial directions thereof.

4. The thrust transfer device according to claim 3, further comprising:
   a thrust bearing disposed on a surface opposite to the screw shaft connection surface of the pressing plate,
   wherein one of track races of the thrust bearing is fixedly mounted to the pressing plate and another one of the track races is mounted in a non-restricted manner, the one of the track races absorbs a rotating motion generated by the planetary motion of the nut members and another one of the track races transfers only thrust generated by the reciprocating motion of the screw shafts.

5. The thrust transfer device according to claim 3, further comprising:
   a motor for control, and a gear for control mounted to be rotatable to a motor shaft of the motor for control,
   wherein the internal tooth gear is provided, on an outer periphery thereof, with an external tooth for control and the control external tooth is connected to the control gear through a geared belt, so that the thrust generated by the reciprocating motion of the plural screw shafts becomes controllable.

* * * * *